United States Patent
Arrasvuori et al.

(10) Patent No.: US 9,661,451 B2
(45) Date of Patent: *May 23, 2017

(54) METHOD AND APPARATUS FOR PROVIDING AN INTERFACE FOR TRIGGERING DEVICE ACTION

(71) Applicant: NOKIA TECHNOLOGIES OY, Espoo (FI)

(72) Inventors: Juha Henrik Arrasvuori, Tampere (FI); Arto Juhani Lehtiniemi, Lempaala (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,013

(22) Filed: May 12, 2016

(65) Prior Publication Data

US 2016/0261977 A1 Sep. 8, 2016

Related U.S. Application Data

(63) Continuation of application No. 13/482,358, filed on May 29, 2012, now Pat. No. 9,354,806.

(51) Int. Cl.
| | |
|---|---|
| *H04W 24/00* | (2009.01) |
| *H04W 4/00* | (2009.01) |
| *G06F 3/0488* | (2013.01) |
| *G06F 11/14* | (2006.01) |
| *H04W 4/02* | (2009.01) |
| *H04W 88/02* | (2009.01) |

(52) U.S. Cl.
CPC .......... *H04W 4/008* (2013.01); *G06F 3/0488* (2013.01); *G06F 11/1464* (2013.01); *G06F 2201/805* (2013.01); *H04W 4/023* (2013.01); *H04W 88/02* (2013.01)

(58) Field of Classification Search
CPC ....... H04W 4/008; H04W 4/02; H04W 4/021; H04W 4/023; H04W 4/025
USPC ...................................... 455/456.1
See application file for complete search history.

(56) References Cited

U.S. PATENT DOCUMENTS

| | | | |
|---|---|---|---|
| 2007/0037605 A1 | 2/2007 | Logan | |
| 2009/0276475 A1* | 11/2009 | Ramsey | ............... H04L 63/083 |
| 2011/0057790 A1* | 3/2011 | Martin | ................ G06Q 10/109 |
| | | | 340/539.13 |
| 2012/0011559 A1 | 1/2012 | Miettinen et al. | |

OTHER PUBLICATIONS

Office Action for U.S. Appl. No. 13/482,358 dated Sep. 16, 2015.
Office Action for U.S. Appl. No. 13/482,358 dated Feb. 20, 2015.
Notice of Allowance for U.S. Appl. No. 13/482,358 dated Jan. 29, 2016.

* cited by examiner

*Primary Examiner* — Kwasi Karikari
(74) *Attorney, Agent, or Firm* — Alston & Bird LLP

(57) ABSTRACT

An approach is provided for causing, at least in part, an identification of one or more triggering devices. A processor may then cause, at least in part, an association of the one or more actions with the one or more triggering devices based, at least in part, on the identification wherein the one or more actions are initiated based, at least in part, on a detection of the one or more triggering devices.

18 Claims, 10 Drawing Sheets

METHOD AND APPARATUS FOR PROVIDING AN INTERFACE FOR TRIGGERING DEVICE ACTION

CROSS REFERENCE TO RELATED APPLICATION

The present application is a continuation of U.S. patent application Ser. No. 13/482,358 filed May 29, 2012, the entire contents of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of automating certain actions to be performed by mobile devices. Many actions may be performed on mobile devices, but important actions are often neglected. For example, users are known to be lazy in taking backups of files on mobile devices. However, there is currently no way to trigger the performance of actions as mobile devices move past specified locations.

SOME EXAMPLE EMBODIMENTS

Therefore, there is a need for an approach for initiating one or more actions based on detection of one or more triggering devices from location-based interfaces.

According to one embodiment, a method comprises causing, at least in part, an identification of one or more triggering devices. The method also comprises causing, at least in part, an association of one or more actions with the one or more triggering devices based, at least in part on the identification, wherein the one or more actions are based, at least in part, on a detection of the one or more triggering devices.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an identification of one or more triggering devices. The apparatus is also caused to cause, at least in part, an association of one or more actions with the one or more triggering devices based, at least in part on the identification, wherein the one or more actions are based, at least in part, on a detection of the one or more triggering devices.

According to another embodiment, a computer-readable storage medium carries one or more sequences of one or more instructions which, when executed by one or more processors, cause, at least in part, an apparatus to cause, at least in part, an identification of one or more triggering devices. The apparatus is further caused to cause, at least in part, an association of one or more actions with the one or more triggering devices based, at least in part on the identification, wherein the one or more actions are based, at least in part, on a detection of the one or more triggering devices.

According to another embodiment, an apparatus comprises means for causing, at least in part, an identification of one or more triggering devices. The apparatus also comprises means for causing, at least in part, an association of one or more actions with the one or more triggering devices based, at least in part on the identification, wherein the one or more actions are based, at least in part, on a detection of the one or more triggering devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

An apparatus is provided comprising means for performing any of the methods described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for initiating one or more actions based on detection of one or more triggering devices from location-based interfaces are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
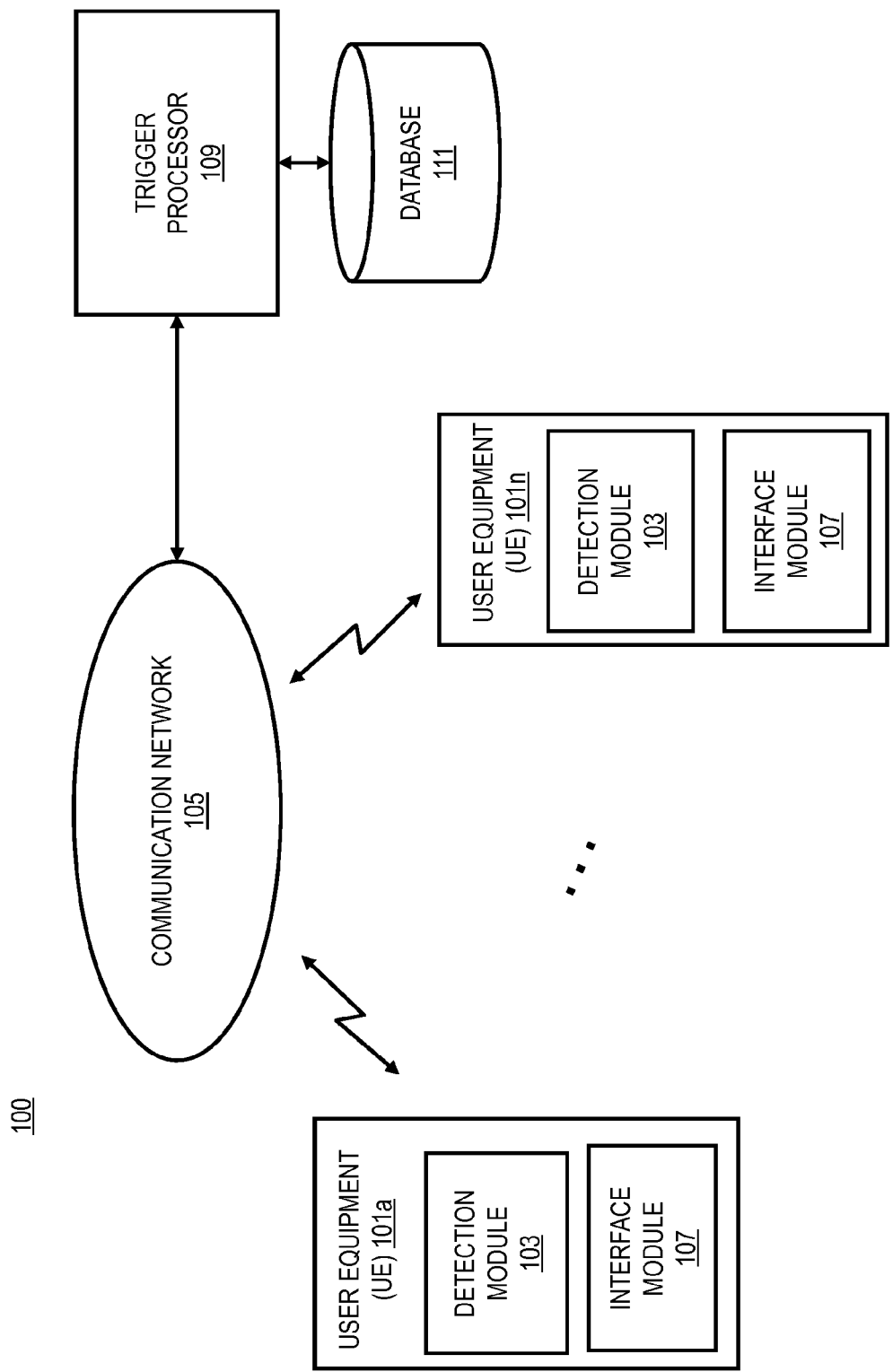
FIG. 1 is a diagram of a system capable of initiating one or more actions based on detection of one or more triggering devices from location-based interfaces, according to one embodiment.

FIG. 1 is a diagram of a system capable of initiating one or more actions based on detection of one or more triggering devices from location-based interfaces, according to one embodiment. Service providers and device manufacturers (e.g., wireless, cellular, etc.) are continually challenged to deliver value and convenience to consumers by, for example, providing compelling network services. One area of interest has been the development of automating certain actions to be performed by mobile devices. Many actions may be performed on mobile devices, but important actions are often neglected. For example, users are known to be lazy in taking backups of files. However, there is currently no way to trigger the performance of actions as mobile devices move past specified locations.

To address this problem, a system 100 of FIG. 1 introduces the capability to initiate one or more actions based on detection of one or more triggering devices from location-based interfaces. In one embodiment, certain locations may cause certain actions to be performed by mobile devices. For example, one or more users may virtually define physical devices and/or locations to act as triggers for the actions. In one scenario, the physical devices and/or locations may be part of model interfaces, including 3-dimensional (3-D) map interfaces. The map interfaces may show indoor or outdoor locations. Representations of physical devices and/or locations in the model interfaces may act as identifiers for triggering devices. Such triggering device identifiers (and triggering devices) may be associated with an action such that an action is performed at a mobile device when the mobile device detects an identifier. For instance, mobile devices may detect identifiers via near field communication (NFC). Actions performed may include any actions performed on mobile devices, including backing up files, displaying one or more actions associated with the identifier, providing an advertisement, checking in an access control system, printing a file, or any combination thereof.

In one embodiment, triggering devices have a NFC field and one or more identifiers. Possible triggering devices may include doors, security gates, elevators, bus stops, electronic billboards, printers, surveillance video cameras, vending machines etc. In one embodiment, such physical objects and/or locations may have representations as part of a user interface, for example, a 3-D map like Nokia City Scene. Mobile devices may then obtain, from the map, the identifier for the triggering device to perform one or more associated actions. In such an embodiment, users may define the physical proximity between their device and the triggering device that will initiate the action. Such proximity may be defined in terms of precise distances. For example, an action may start when a mobile phone is within one meter from the triggering device. In such cases, Bluetooth signal strength may be used to detect proximity between devices. In another embodiment, mobile devices may detect triggering devices as objects in a representation created by the user. For instance, a triggering device identifier may be recognized in a picture taken by a user using the mobile device. For such a scenario, an action may be initiated when the identifier is detected in the camera picture.

In yet another embodiment, the interface could be a presentation of something non-physical, such as a graph of social interaction. For example, some detected social interaction may serve as a triggering device or identifier that may serve as the catalyst for an action on a mobile device. In one such scenario, a social network containing a certain number of members may serve as a triggering device, whereupon an action, such as a service upgrade or special promotion, is performed at a mobile device when the threshold number of members is reached. Other mobile devices may also serve as triggering devices. For instance, one mobile device may detect the presence of another mobile device that serves as a triggering device, perhaps, to initiate the action of a status update at a social network. For such a case, the triggering may be configured such that the triggering is reciprocal. In other words, mobile devices may act as triggering devices for each other so the mobile devices do not have to set up the association between the triggering device and action each time. Another scenario for such triggering may include setting up mobile devices that are part of the same social network to be triggering devices for each other, so when mobile devices that are part of the same social network are in close proximity, the action is initiated. For one case, a social network may display a status update when mobile devices associated with users in a subset (or group) within the network are in close proximity.

In a further embodiment, the interfaces and identifiers may permit users to define the actions associated with the triggering devices. For example where the action includes backing up files, the system 100 may provide the user with folders that may be backed up. In one scenario, a user's mobile phone may connect with backup service(s) via e.g. 2/3/4G cellular data, WAN/WLAN or close-proximity radio like Bluetooth to make the backup. In other words, the triggering device may not make perform the action itself, it may simply serve as a trigger for the action. The action may be performed by another device in another location. In another scenario, the triggering device may perform the action itself, for example if the action is to print a document and the triggering device is a printer. The system 100 may be configured such that a mobile device's detection of the printer triggering device, initiates printing of a document from the very same printer. In another scenario, the triggering device, or a third device, may exchange information (e.g. media content, contact information, digital business cards, etc.) with the user's mobile phone.

In one embodiment, the system 100 may scan an interface, then present all the possible triggering device identifiers that are part of the interface. For instance, the system 100 may provide the user with the option to scroll over a 3-D map interface to see all the possible triggering devices (as represented by identifiers in the interface). In one scenario, the 3-D map may be of an indoor location, where the user may select possible actions to associate with the triggering devices. In such a scenario, the user may choose, for instance, a file backup operation when a mobile phone is in a certain proximity of an office. In another scenario, the 3-D map may be of an outdoor location and the user may select a possible action such as paying car parking or transferring money into a toll booth when the mobile device is within a given proximity of a door or gate.

In one embodiment, the interface may provide users further information as to the one or more actions. In some instances, such information may help the user define the actions with more detail. In one scenario, the interface may permit the user to drag-and-drop files from one or more applications, to the identifiers to cause an association between the user-desired action and the triggering devices. In a further scenario, the system 100 may create a presentation of information relevant to the action, including status information, historical information, related data, or a combination thereof. Status information may refer to the status of the backup process, for example, a running bar depicting a percentage of completion. Historical information may include the backup instances for each file or folder, including a listing of dates and/or times of the most recent file backup process. Related data may include data, such as the files themselves, or a combination thereof. The presentation may be part of the 3-D interface and/or an Augmented Reality view of the associated identifier. With such related data, the user may gain assurance that the actions are performed in accordance to user expectations.

In one embodiment, initiating certain actions at mobile devices may include determining one or more applications, services, or a combination thereof based, at least in part, on the detection of one or more triggering devices. For instance, the action of backing up a file may require a file backup application to execute the action. The triggering device may initiate the action by notifying the file backup application when the triggering device and mobile device are within a pre-set proximity.

In another embodiment, triggering devices may be detected via one or more detecting devices. For one instance, mobile devices may serve as detecting devices. In this embodiment, initiating the action may take into account the context information, capability information, or a combination thereof associated with one or more detecting devices, one or more triggering devices, or a combination thereof. Context information may refer to the location and/or orientation of a device, while capability information may include what the device is capable of, including device specifications, available applications, memory space, etc.

One example of where triggering device and detecting device context information affects the action performed, is where triggering devices may initiate the actions upon detecting user information associated with the mobile devices. For instance, physical shops may employ digital services that can access user information associated with mobile devices. Then, the shops may push certain kinds of personalized advertisements and/or coupons to the user when the user walks by the shop door. For such a scenario, the shop door may be a triggering device. Users may define, through the interface, certain specifications, such as the shops that may interact with the mobile devices to provide advertisements and/or coupons or the types of interactions that shops may have with the mobile devices.

For one use case, a user may leave an office and walk past a door with a file storage device adjacent to it, where walking past the device's NFC field triggers the backup function for work-related files on the user's device. To perform the backup function, the mobile device may run a NFC monitoring daemon or other background process that notifies applications registered to it when it detects a nearby NFC triggering device. For example, the notification may include the one or more identifiers associated with the detected triggering device. In such a case, the backup application may have registered to the NFC device monitoring daemon that it wanted to receive all NFC device identifiers upon detection. The backup application may then receive the one or more NFC identifiers from the NFC monitoring deamon and begin searching an internal data structure, such as a database, to see whether there is an action associated with the identifiers.

In this file backup case, there is an entry related to the identifier containing information related to actions that need to be performed when the identifier is detected. The entry may be as follows:

| ID | Action | Source | Destination |
| --- | --- | --- | --- |
| XYZ | backup | My Documents/Work | http://backup.com/myaccount |

In other words, the application is to perform backup operation of files under the local file system path "My Documents/Work" into the online backup service <http://backup.com/myaccount> whenever the NFC identifier "XYZ" is observed. In one embodiment, the backup application may support various backup service application programming interfaces, through which it may perform the backup action. To initially set up the backup application, the user may provide requisite access credentials or authentication for each backup service he wishes to use. For example, the user may provide login credentials for the account "myaccount" in the <http://backup.com> service to use the application.

In one embodiment, authentication may include special verifications for the initial set-up. For example, the initial set-up for an action of checking into a building may require that a mobile device actually be present at the physical location of a triggering device. Subsequently, the check-in may occur using the identifier of the triggering device, which may be a presentation of the physical location. Such an authentication may provide some increased control in the set-up process.

As shown in FIG. 1, the system 100 comprises a user equipment (UE) 101 (or UEs 101a-101n) having connectivity to a detection module 103 (or detection modules 103a-n), an interface module 107 (or interface modules 107a-n), a trigger processor 109, and a database 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the detection modules 103 may detect one or more identifiers associated with one or more triggering devices. In one embodiment, the detection modules 103 may detect one or more identifiers using, at least in part, short range wireless communications including NFC. In another embodiment, the detection modules 103 may work with detecting devices to detect one or more triggering devices. In such a situation, the triggering devices may be the devices that actually perform the action, such as a printer that acts as a triggering device where the action is printing a document from a mobile device. In these cases, the detection modules 103 may further determine context information, capability information, or a combination thereof associated with the detecting devices, triggering devices, or a combination thereof, and initiate the actions accordingly. For instance, the detection modules 103 may assess the location or device capabilities of the detecting devices and/or triggering devices. In one such scenario following from the printing example, the detection module 103 may detect that a printer triggering device requires a software update to perform the printing and act accordingly, either by initiating software update and/or halting printing.

In one embodiment, the detection modules 103 may interact with the interface modules 107 for the user to configure detection for detecting devices and triggering devices. In one embodiment, the interface modules 107 may generate the user interfaces for the users to select the one or more actions to associate with the one or more triggering devices. As discussed above, the interface modules 107 may create physical or non-physical representations containing identifiers associated with triggering devices for users to associate the triggering devices with actions. In one embodiment, such interfaces include location-based interfaces with representations of triggering devices. For instance, the interface modules 107 may create a 3-D map of an office with the office door image as a representation for the actual office door that serves as a triggering device. UEs 101 may display the interfaces so that users may select one or more actions to be associated with triggering devices as depicted by identifiers in the interfaces. When users interact with the interfaces, the interface modules 107 may inform the trigger processor 109 of user selections in associating actions with triggering devices.

Once the detection modules 103 and interfaces modules 107 detect the triggering devices, the trigger processor 109 may initiate one or more actions associated with the one or more triggering devices. To do so, the trigger processor 109 may determine the triggering devices detected, identify the one or more actions associated with the triggering device, then initiate the actions. To initiate the actions, the trigger processor 109 may notify applications and/or services associated with the actions. In one embodiment, the database 111 may keep track of the triggering devices and possible actions associated with the triggering devices, updating devices as they are added to a setting, and adjusting the possible actions in accordance to system capabilities.

By way of example, the UE 101, detection modules 103, interface modules 107, trigger processor 109, and database 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2)

header, an internetwork (layer 3) header and a transport (layer 4) header, and various application (layer 5, layer 6 and layer 7) headers as defined by the OSI Reference Model.

Figure 2:
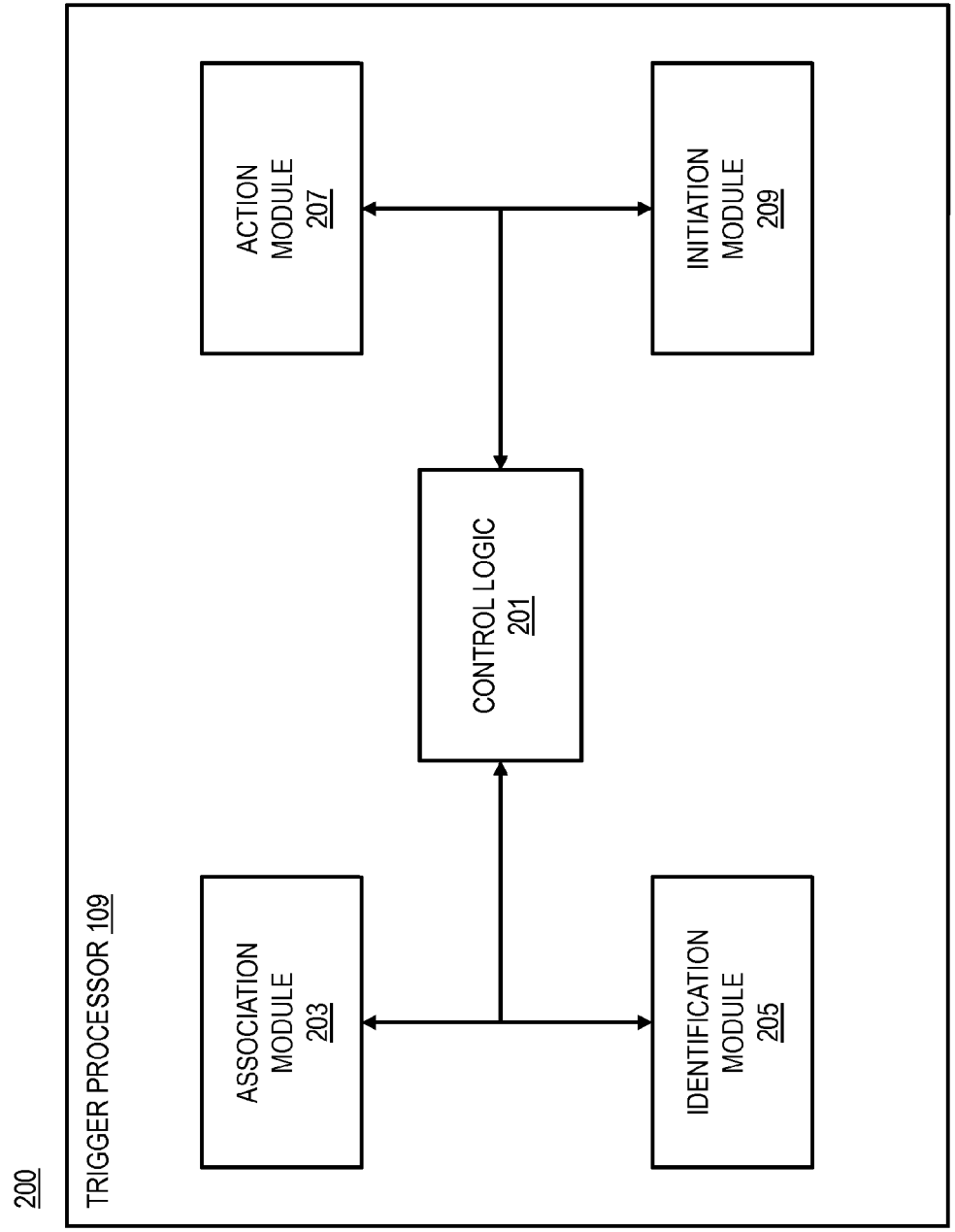
FIG. 2 is a diagram of the components of the trigger processor, according to one embodiment.

FIG. 2 is a diagram of the components of the trigger processor 109 according to one embodiment. By way of example, the trigger processor 109 includes one or more components for providing one or more actions based on detection of one or more triggering devices from location-based interfaces. It is contemplated that the functions of these components may be combined in one or more components or performed by other components of equivalent functionality. In this embodiment, the trigger processor 109 includes an association module 203, identification module 205, action module 207, and initiation module 209. The control logic 201 executes at least one algorithm for executing functions at the trigger processor 109.

For example, in one embodiment, the control logic 201 may work with the association module 203 to determine the actions dictated by user interactions received from the interface modules 107. As previously discussed, users may interact with interfaces produced by the interface module 107 to select desired actions. The association module 203 may process these selections and triggering device identifiers displayed in conjunction with the selections to associate one or more actions with one or more triggering devices.

In one embodiment, the identification module 205 may work with the control logic 201 to determine the one or more triggering devices associated with the one or more identifiers detected. In one embodiment, the identification module 205 may determine one or more applications, one or more services, or a combination thereof to perform the one or more actions. The determination of one or more applications, services, or a combination thereof may be based, at least in part, on the one or more triggering devices detected. In one embodiment, the control logic 201 may then work with the action module 207 to determine context information, capability information, or a combination thereof associated with the one or more detecting devices. In doing so, the action module 207 and control logic 201 may cause a determination, modification, or a combination thereof of the one or more actions. For example, the action module 207 may determine that a detecting device and/or triggering device no longer has any memory space to store more backups. The action module 207 may then modify the action of creating a backup, to instead, notify the UE 101 of the memory space limitation and request that the UE 101 select an alternate mode of action, including saving to another location, clearing memory space, etc.

From there, the control logic 201 and initiation module 209 may initiate the one or more actions based on the applications and/or services determined by the identification module 205 and any determinations and/or modifications found by the action module 207. In one scenario, the initiation of the one or more actions, applications, services, or a combination thereof may include an authentication of the one or more triggering devices, detecting devices, or a combination thereof, where the initiation module 209 may not initiation the action without the authentication. In an additional scenario, the initiation module 209 and control logic 201 may determine status information, historical information, related data, or a combination thereof associated with the one or more actions. The initiation module 209, control logic 201, and interface modules 107 may then cause, at least in part, a presentation of the status information, historical information, related data, or a combination thereof so assure users that the actions are being carried out.

Figure 3:
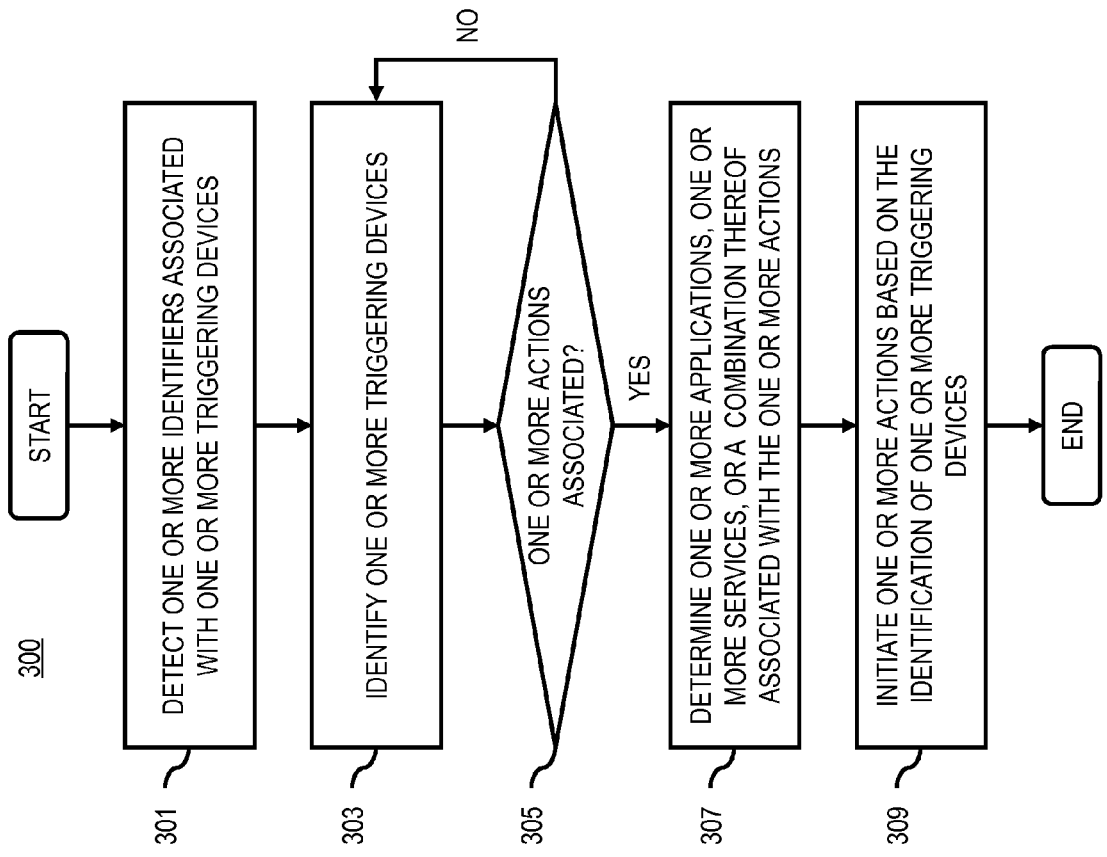
FIG. 3 is a flowchart of a process for initiating one or more actions based on one or more detected triggering devices, according to one embodiment.
Figure 8:
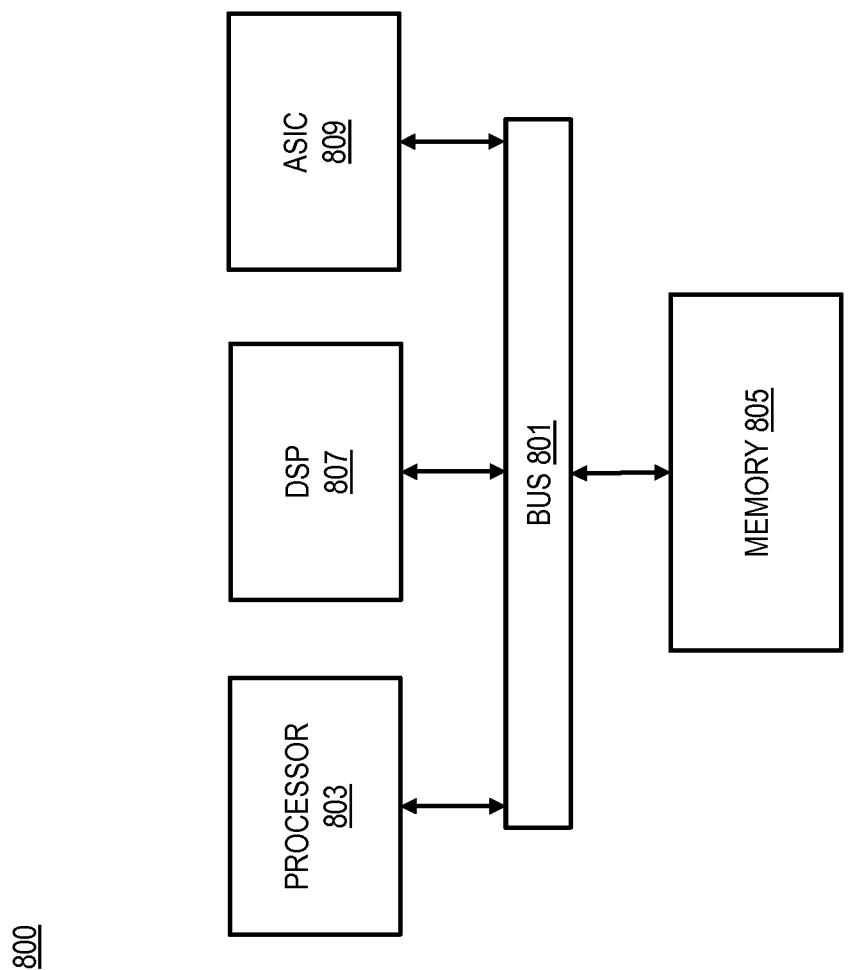
FIG. 8 is a diagram of a chip set that can be used to implement an embodiment of the invention.

FIG. 3 is a flowchart of a process for initiating one or more actions based on detection of one or more triggering devices from location-based interfaces, according to one embodiment. In one embodiment, the trigger processor 109 performs the process 300 and is implemented in, for instance, a chip set including a processor and a memory as shown in FIG. 8. In step 301, the control logic 201 may determine the identification of one or more triggering devices based, at least in part, on a detection of one or more identifiers associated with the one or more triggering devices. In one embodiment, the control logic 201 may determine the identification, wherein the detection is based, at least in part, on short range wireless communications including, at least in part, NFC. Then, the control logic 201 may cause, at least in part, an identification of one or more triggering devices and cause, at least in part, an association of one or more actions with the one or more triggering devices based, at least in part, on the identification (steps 303 and 305). As previously discussed, the control logic 201 may engage one or more actions, wherein the one or more actions include, at least in part, (a) performing one or more backup operations, (b) presenting a list of the one or more actions associated with a detected one of the one or more triggering devices, (c) providing related information, (c) determining a check-in status, (d) printing a file, or (e) a combination thereof. In one embodiment, the control logic 201 may cause, at least in part, an authentication of the one or more triggering devices, the one or more detecting devices, or a combination thereof, wherein eh initiation of the one or more actions, the one or more application, the one or more services, or a combination thereof is based, at least in part, on authentication.

After determining the associated one or more actions, the control logic 201 may determine one or more applications, one or more services, or a combination thereof based, at least in part, on the detection of the one or more triggering devices; and cause, at least in part, an initiation of the one or more applications, the one or more services, or a combination thereof to perform the one or more actions (step 307). In such a way, control logic 201 may cause actions wherein the one or more actions are initiated based, at least in part, on a detection of the one or more triggering devices (step 309).

Figure 4:
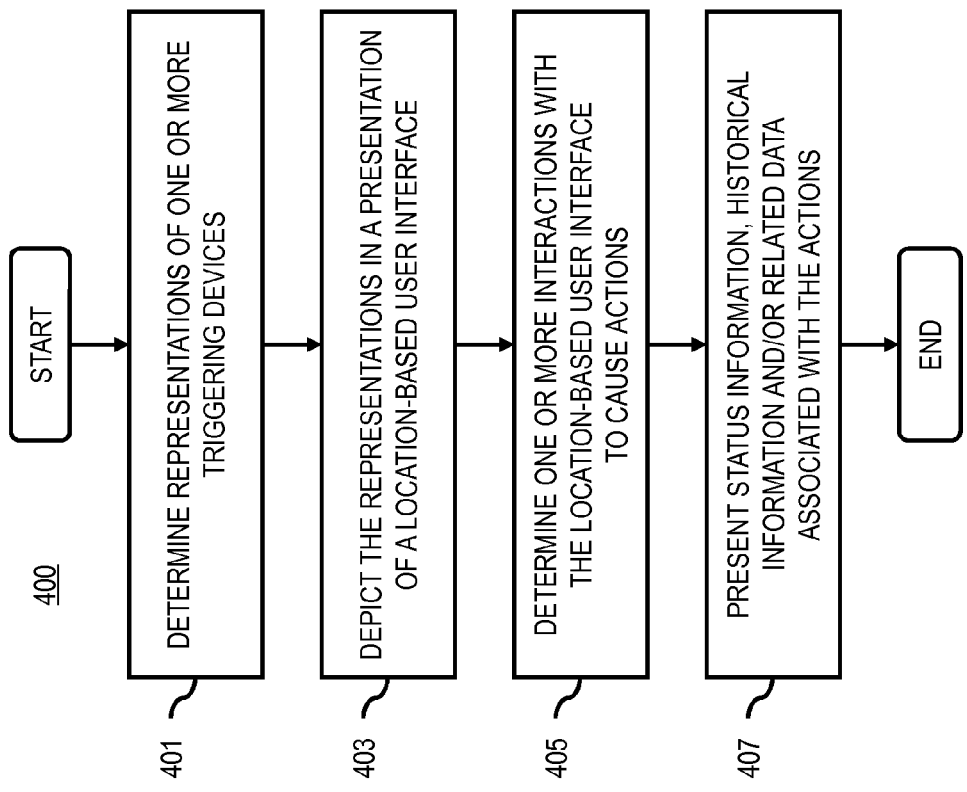
FIG. 4 is a flowchart of a process for associating one or more actions with one or more triggering devices using user interfaces, according to one embodiment.

FIG. 4 is a flowchart of a process for initiating one or more actions based on detection of one or more triggering devices from location-based interfaces, according to one embodiment. In one embodiment, the trigger processor 109 performs the process 400 and is implemented in, for instance, a chip set including a processor and a memory as shown in FIG. 8. In one embodiment, the control logic 201 may create the association, first, by causing, at least in part, a presentation of a location-based user interface depicting one or more representations of the one or more triggering devices (steps 401 and 403). The association may be solidified with the control logic 201 determining one or more interactions with the location-based user interface to cause, at least in part, an initiation of (a) the association of the one or more actions with the one or more triggering devices, (b) the one or more actions, or (c) a combination thereof. To further provide information, the interface modules 107 may determine status information, historical information, related data, or a combination thereof associated with the one or more actions (step 405), and cause, at least in part, a presentation of the status information, the historical information, the related data, or a combination thereof in the location-based user interface previously discussed (step 407).

Figure 5:
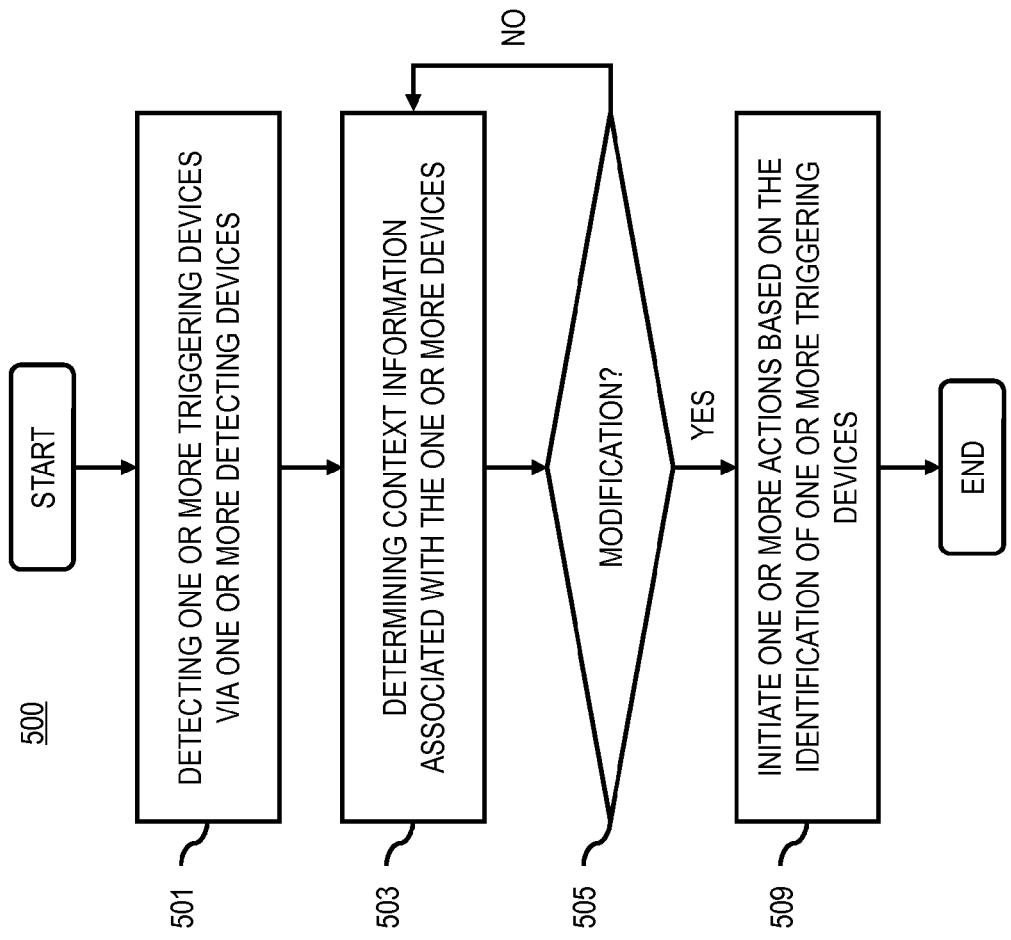
FIG. 5 is a flowchart of a process for initiating one or more actions with context information, capability information, or a combination thereof, according to one embodiment.

FIG. 5 is a flowchart of a process for initiating one or more actions based on detection of one or more triggering devices from location-based interfaces, according to one embodiment. In one embodiment, the trigger processor 109 performs the process 500 and is implemented in, for instance, a chip set including a processor and a memory as shown in FIG. 8. In step 501, the control logic 201 may detect one or more triggering devices via one or more detecting devices. In doing so, the control logic 201 may determine context information, capability information, or a combination thereof associated with the one or more detecting devices, the one or more triggering devices, or a combination thereof (step 503), wherein the initiation of the one or more actions, the one or more applications, the one or more services, or a combination thereof is based, at least in part, on the context information, the capability information, or a combination thereof.

Furthermore, the control logic 201 may cause, at least in part, a determination, a modification, or a combination thereof of the one or more actions based, at least in part, on the context information, the capability information, or a combination thereof (step 505). For step 507, the control logic may then initiate the one or more actions, applications, services, or a combination thereof, according to the determination, modification, or a combination thereof.

Figure 6A:
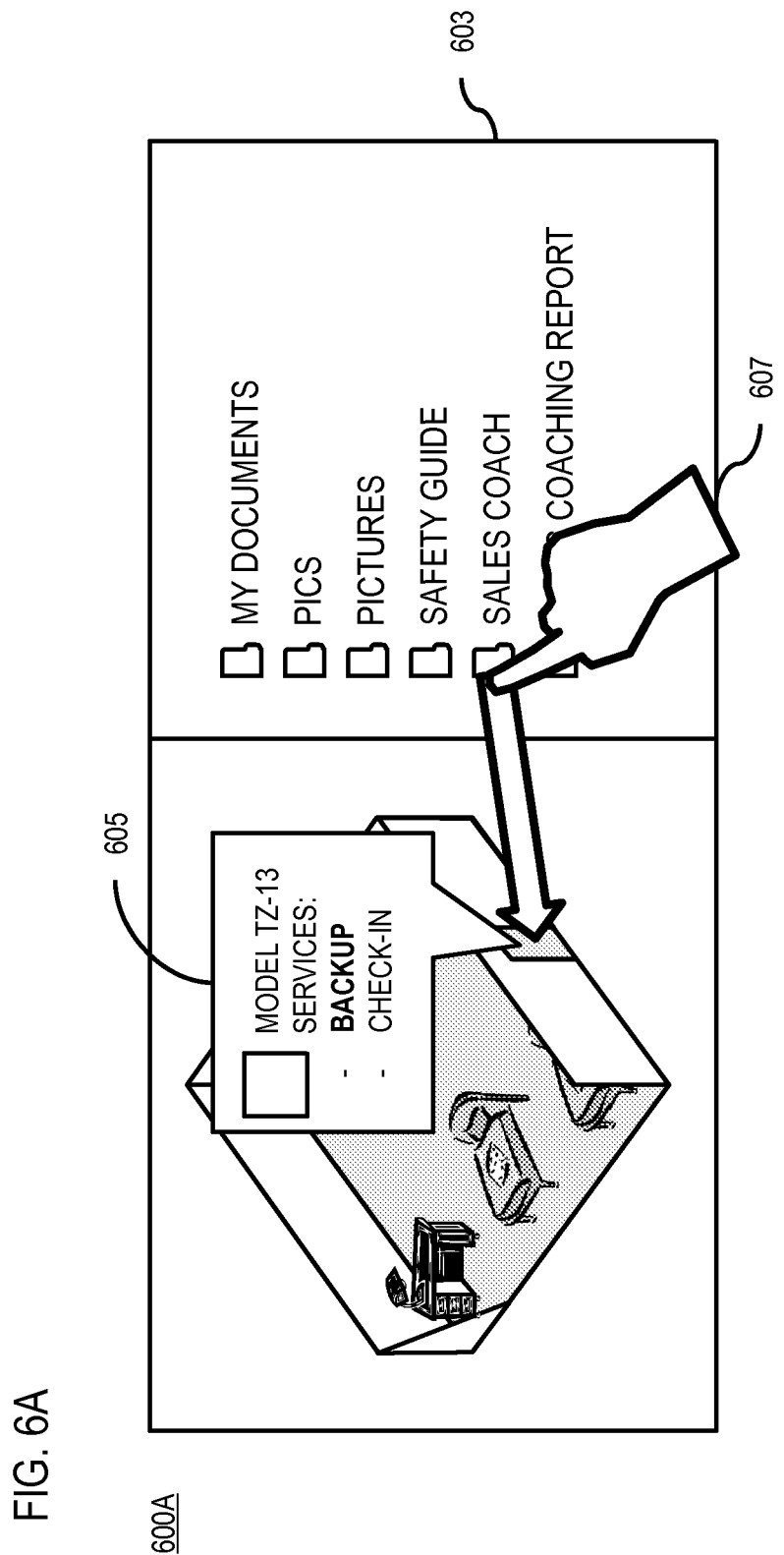
FIGS. 6A-6B are diagrams of user interfaces utilized in the processes of FIG. 4, according to various embodiments.
Figure 6B:
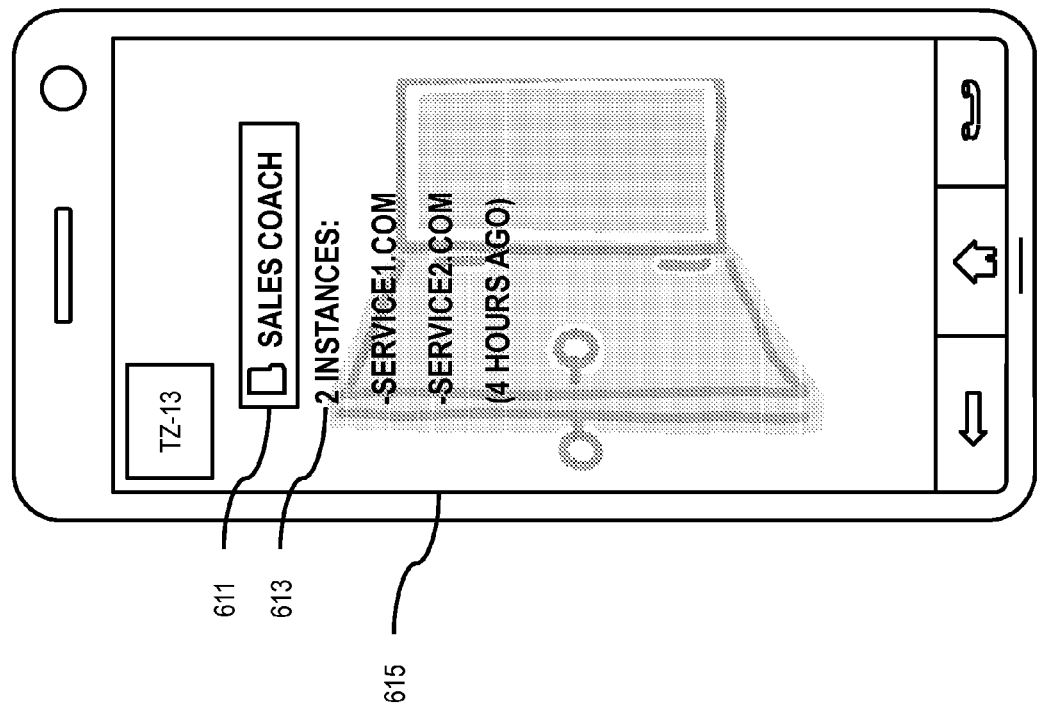

FIGS. 6A-6B are diagrams of user interfaces utilized in the processes of FIG. 4, according to various embodiments. FIG. 6A is a diagram of an interface 600A for defining a NFC device through an indoor 3-D model. For instance, the interface 600A may be a 3-D indoor model through which a user has defined an office door 601 as an identifier for triggering the backup creation of a Sales Coach folder 603 on his mobile device. The interface may further include a display of properties of the device, as given by pop-up menu 605. The user may then select 607 the services for the backup, from the properties pop-up menu 605. More specifically, the user may open a 3-D model applications (e.g. Nokia City Scene), click on the office door 601 as an identifier on the model, and have pop-up menu 605 display the information relating to the mobile device and/or the triggering device, such as the device specifications, name, type, and services that may be linked to it, such as backing up files. As shown by interface 600A, upon selecting the "Backup" service, the user may drag-and-drop the Sales Coach folder 603. This may cause the identifier, backup operation, and selected folder information to be communicated to the backup application (and/or service). As a result, the backup application may create a new data entry, for instance:

IDOAO backup Sales Coach http://backup.com/myaccount

The backup location at <http://backupcom/myaccount> may be predetermined by the user as a default backup location. Alternately, the backup application may prompt the user to select a backup location by selecting from a list of possible backup locations.

FIG. 6B is a diagram of an interface 600B for displaying information associated with one or more actions. For the embodiment in interface 600B, the presentation may be an Augmented Reality view of a door 609, including an icon 611 for a backed up folder and information regarding the backup process, such as the number 613 of backup instances and properties 615 of the instances. This information may be polled from the server(s) when the user approaches the triggering device and subsequently be updated continuously. In one embodiment for generating such an interface, the Augmented Reality application may use the NFC monitoring daemon to obtain the identifier. The system 100 may then communicate the identifier with the backup application and determine actions associated with the identifier (and triggering device), as well as information regarding the status' of the actions. The backup application may then receive the identifier and fetch information regarding backup action associated with the identifier. Specifically for the properties 615, the backup application may contact backup services "SERVICE1.COM" and "SERVICE2.COM" to query the status of the backups of the "Sales Coach" folder 603. Once the backup application receives the status from the backup services, the backup application may return the information to the Augmented Reality application to create the interface 600B.

In one instance, when the user enters the coverage area of the NFC daemon, the service may automatically notify backup servers to verify that they are online so that the backup may be created or a previous backup may be retrieved. If a backup server is unavailable, the service may create a temporary backup of the files to a Cloud service, where the saved file is automatically moved to the original backup server when the server becomes available.

The processes described herein for an approach for initiating one or more actions based on detection of one or more triggering devices from location-based interfaces may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
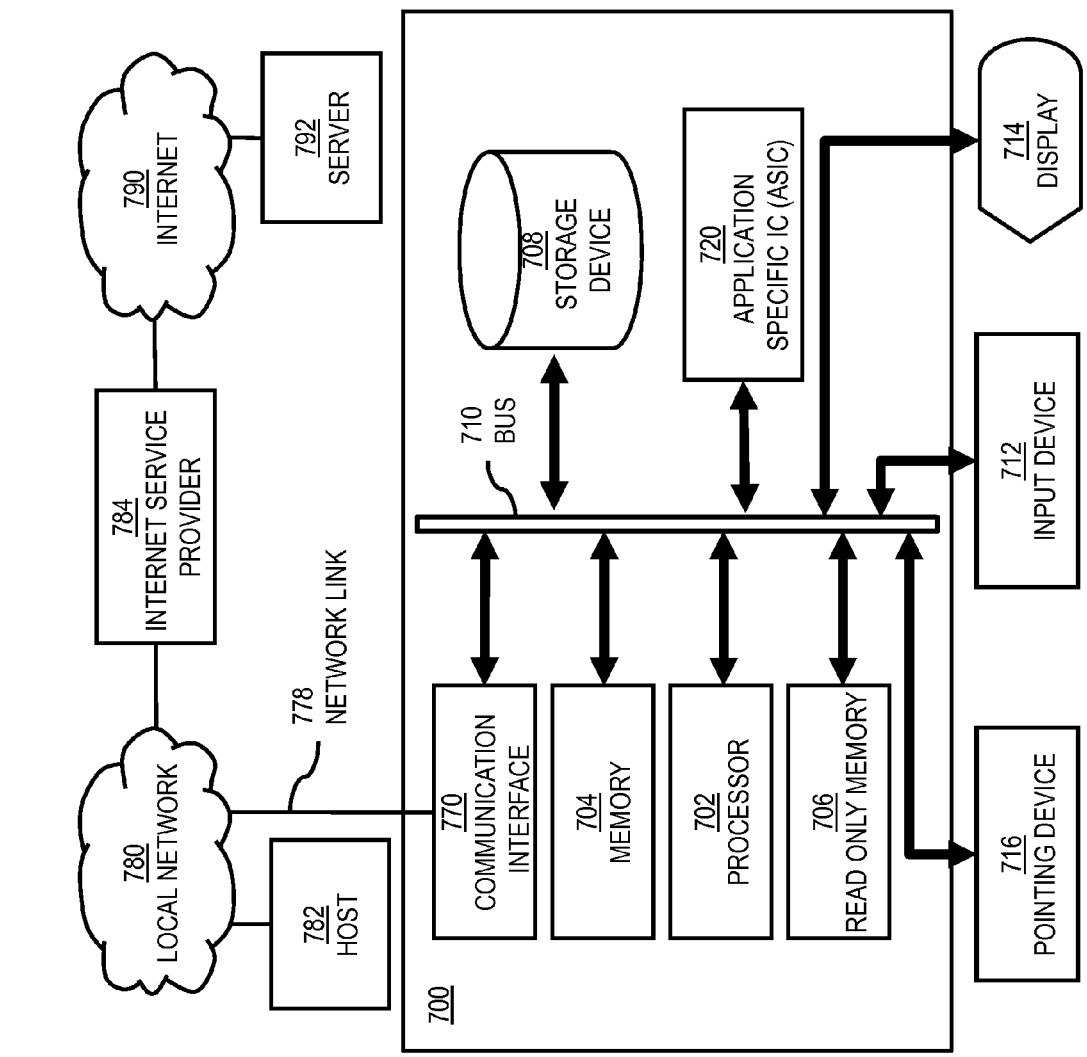
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to share items using audio as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of securely distributing files via social networks.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to initiating one or more actions based on detection of one or more triggering devices from location-based interfaces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for initiating one or more actions based on detection of one or more triggering devices from location-based interfaces. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for initiating one or more actions based on detection of one or more triggering devices from location-based interfaces, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for initiating one or more actions based on detection of one or more triggering devices from location-based interfaces.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to share items using audio described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of initiating one or more actions based on detection of one or more triggering devices from location-based interfaces.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to share items using audio. The memory 805 also stores the data associated with or generated by the execution of the inventive steps.

Figure 9:
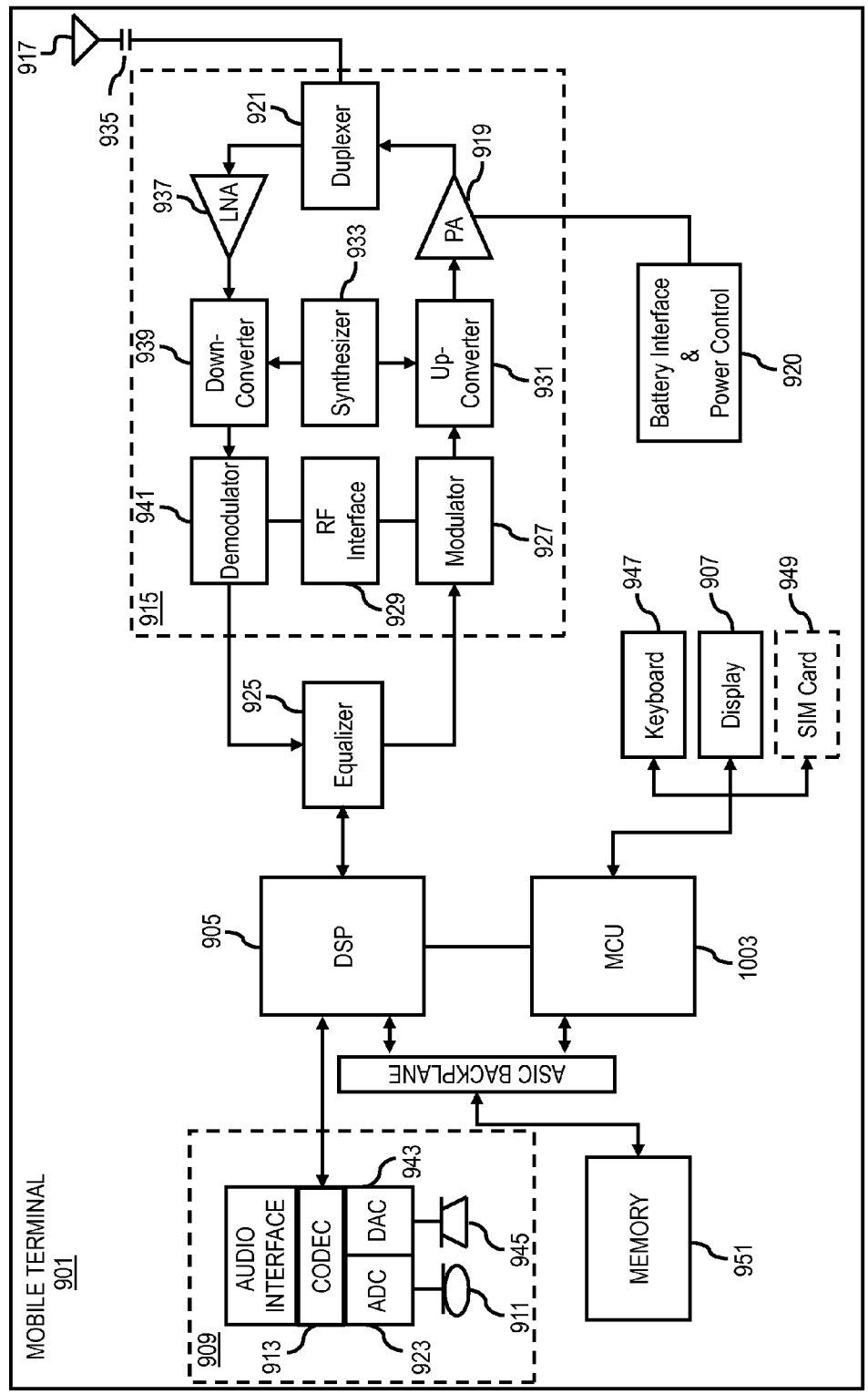
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of initiating one or more actions based on detection of one or more triggering devices from location-based interfaces. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of initiating one or more actions based on detection of one or more triggering devices from location-based interfaces. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to share items using audio. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving an indication of an identification of one or more triggering devices based on a detected proximity of a mobile device to the one or more triggering devices;
   causing presentation of a location-based user interface depicting one or more representations of the one or more triggering devices;
   determining one or more interactions with the location-based user interface to cause an initiation of an association of a backup operation with the one or more triggering devices; and
   in response to the identification of the one or more triggering devices based on the detected proximity of the mobile device and in response to the association of the backup operation with the one or more triggering devices, initiating a backup of data from the mobile device to another device.

2. The method of claim 1, wherein the detection is based on short range wireless communications comprising near field communications.

3. The method of claim 1, wherein the backup of data occurs via a local area network.

4. The method of claim 1, further comprising:
   in response to the identification of the one or more triggering devices, causing data from the mobile device to be printed on a printer.

5. The method of claim 1, wherein the one or more interactions comprises at least a user configuration of the one or more triggering devices to cause performance of a selected action.

6. The method of claim 1, further comprising:
   determining status information, historical information, related data, or a combination thereof associated with the backup of data; and
   causing presentation of the status information, the historical information, the related data, or a combination thereof in the location-based user interface.

7. The method of claim 1, further comprising:
   determining capability information associated with the mobile device, the one or more triggering devices, or a combination thereof, wherein the initiating the backup of data is based at least on the capability information.

8. The method of claim 1, further comprising:
   authenticating the one or more triggering devices, the mobile device, or a combination thereof, wherein the initiating of the backup of the data occurs in response to the authentication.

9. The method of claim 1, further comprising:
   causing presentation of one or more actions associated with a detected one of the one or more triggering devices.

10. An apparatus comprising:
    at least one processor; and
    at least one memory including computer program code for one or more programs, the at least one memory and the computer program code configured to, with the at least one processor, cause the apparatus to perform at least the following:
    receiving an indication of an identification of one or more triggering devices based on a detected proximity of a mobile device to the one or more triggering devices;
    causing presentation of a location-based user interface depicting one or more representations of the one or more triggering devices;
    determining one or more interactions with the location-based user interface to cause an initiation of an association of a backup operation with the one or more triggering devices, and
    in response to the identification of the one or more triggering devices based on the detected proximity of the mobile device and in response to the association of the backup operation with the one or more triggering devices, initiating a backup of data from the mobile device to another device.

11. The apparatus of claim 10, wherein the detection is based on short range wireless communications comprising near field communications.

12. The apparatus of claim 10, wherein the backup of data occurs via a local area network.

13. The apparatus of claim 10, further comprising:
in response to the identification of the one or more triggering devices, causing data from the mobile device to be printed on a printer.

14. The apparatus of claim 10, wherein the one or more interactions comprises at least a user configuration of the one or more triggering devices to cause performance of a selected action.

15. The apparatus of claim 1, wherein the apparatus is further caused to:
determine status information, historical information, related data, or a combination thereof associated with the backup of data; and
cause a presentation of the status information, the historical information, the related data, or a combination thereof in the location-based user interface.

16. The apparatus of claim 10, wherein the detection of the one or more triggering devices is via one or more detecting devices, wherein the apparatus is further caused to:
determine capability information associated with the mobile device, the one or more triggering devices, or a combination thereof, wherein the initiating the backup of data is based on the capability information.

17. The apparatus of claim 10, wherein the apparatus is further caused to:
cause, at least in part, an authentication of the one or more triggering devices, the mobile device, or a combination thereof, wherein the initiating of the backup of the data occurs in response to the authentication.

18. A computer program product comprising at least one non-transitory computer-readable storage medium having computer-executable program code instructions stored therein, the computer-executable program code instructions comprising program code instructions to:
receive an indication of an identification of one or more triggering devices based on a detected proximity of a mobile device to the one or more triggering devices;
cause presentation of a location-based user interface depicting one or more representations of the one or more triggering devices;
determine one or more interactions with the location-based user interface to cause an initiation of an association of a backup operation with the one or more triggering devices, and
in response to the identification of the one or more triggering devices based on the detected proximity of the mobile device and in response to the association of the backup operation with the one or more triggering devices, initiate a backup of data from the mobile device to another device.

* * * * *

UNITED STATES PATENT AND TRADEMARK OFFICE
CERTIFICATE OF CORRECTION

PATENT NO. : 9,661,451 B2
APPLICATION NO. : 15/153013
DATED : May 23, 2017
INVENTOR(S) : Arrasvuori et al.

It is certified that error appears in the above-identified patent and that said Letters Patent is hereby corrected as shown below:

In the Claims

Column 20,
Line 61, "devices," should read --devices;--.

Column 21,
Line 15, "claim 1" should read --claim 10--.

Column 22,
Line 21, "devices," should read --devices;--.

Signed and Sealed this
Twenty-seventh Day of March, 2018

Andrei Iancu
*Director of the United States Patent and Trademark Office*